United States Patent [19]

Ference et al.

[11] 4,329,400

[45] May 11, 1982

[54] GLASS ARTICLE HAVING A PATTERN FORMED IN ITS SURFACE AND METHOD

[75] Inventors: Joseph Ference; John E. Megles, Jr.; Hermann L. Rittler, all of Corning, N.Y.

[73] Assignee: Corning Glass Works, Corning, N.Y.

[21] Appl. No.: 103,415

[22] Filed: Dec. 13, 1979

[51] Int. Cl.³ .............................................. B32B 17/06
[52] U.S. Cl. ........................................ 428/426; 65/33
[58] Field of Search .................. 428/426, 446; 106/52, 106/54; 65/33

[56] References Cited

U.S. PATENT DOCUMENTS

| | | | |
|---|---|---|---|
| 2,321,987 | 6/1943 | Brown | 106/52 |
| 2,683,666 | 7/1954 | Duncan et al. | 106/52 |
| 2,684,911 | 7/1954 | Stookey | 106/52 |
| 2,956,892 | 10/1960 | Duncan | 106/52 |
| 2,965,503 | 12/1960 | Hagedorn et al. | 106/52 |
| 3,275,492 | 9/1966 | Herbert | 65/33 X |
| 3,741,861 | 6/1973 | Andrieu | 65/33 X |
| 3,764,283 | 10/1973 | Hagedorn | 65/33 |

*Primary Examiner*—Lorraine T. Kendell
*Attorney, Agent, or Firm*—Clinton S. Janes, Jr.

[57] ABSTRACT

There is disclosed an integral vitreous article composed of an opacified interior portion encased within a surface layer of glass that is transparent except for an opacified zone of predetermined configuration. The article may be produced by momentarily contacting an exposed surface on a molten glass charge with a chilling member before forming the glass.

5 Claims, 3 Drawing Figures

GLASS ARTICLE HAVING A PATTERN FORMED IN ITS SURFACE AND METHOD

RELATED APPLICATIONS

Ser. No. 103,414, filed of even date herewith in the name of H. L. Rittler and entitled "Integral Vitreous Article Composed of Opaque and Transparent Portions and Method", concerns an integral vitreous article of an alkaline alumino-silicate nature which becomes opacified or crystallized on cooling, and which, by rapid extraction of heat from the article surface during forming, has a continuous, unbroken, transparent, glassy surface layer or skin completely encasing the article.

Ser. No. 103,413, also filed of even date herewith in the name of H. L. Rittler, but entitled "Borosilicate, Opal Glass Article", concerns an integral glass article of a borosilicate nature which becomes opacified on cooling due to phase separation of the glass, and which is completely encased in a continuous, unbroken, transparent, single-phase glass layer produced by rapid extraction of heat from the glass surface during formation of the article.

BACKGROUND OF THE INVENTION

The present invention relates, generally, to a modified form of the integral, vitreous articles disclosed in the above-mentioned Rittler applications. It is more particularly concerned with such an article in which the transparent surface layer is modified by the formation therein of an opacified zone of predetermined pattern or configuration.

The articles disclosed in the Rittler applications have a white opaque appearance in the absence of a glass colorant. However, a particular feature of those applications is the addition to a glass melt in minor amount, of an oxide and/or a noble metal which couples with titania to produce unique color effects. The result of such addition is essentially a solid color body, although there may be a transparent edge on a pressed plate or similar article which has a different appearance.

One product contemplated for production from the new opacified materials is pressed dinnerware, in particular dinner plates. While solid color ware meets a substantial demand in this field, experience has demonstrated that the consumer frequently is not satisfied with a solid color, but demands that a decorative, multicolor pattern be applied. In view of this demand, a great deal of effort has been devoted to the development of decorative decals, silk screen decorations, and other applied patterns for dinnerware and cookware. In general, however, these decorations require additional production steps and materials that add substantially to the article cost. Also, since they are generally applied over the glass surface and fired thereon, there is always a problem of physical and chemical durability in service.

It is then a primary purpose of the present invention to provide an article as described in either of the companion applications, but having a portion of its transparent surface layer modified to provide an opacified appearance. Another purpose is to provide such articles with a decoration formed within the article surface, rather than applied thereto. A more specific purpose is to provide an integral, vitreous, opacified article having a transparent glass surface with a pattern, decorative or otherwise, of predetermined configuration formed in the surface skin of such article.

PRIOR ART

The companion Rittler applications recite a considerable amount of literature relating to the articles and methods there described and claimed. In view of the relationship between the subject matter of those applications and the present application, such disclosure is incorporated herein by reference.

Particular attention is directed to the description of an opal glass of the reheat type, and based on titania in the glass composition, in U.S. Pat. No. 2,691,855 (Armistead). This type of opal glass, and the technique involved in producing opacity in such a glass, are also described in U.S. Pat. No. 2,921,860 (Stookey).

Various procedures are described in the literature for partially opacifying a glass body, or for developing an opal pattern of one nature or another in a glass body. For example, U.S. Pat. Nos. 2,651,145 and 2,651,146 (Stookey) disclose glasses which are opacifiable by photosensitive techniques. These patents further describe differential treatment of selected zones in a photosensitive glass body to render such selected zones opaque.

SUMMARY OF THE INVENTION

The present invention relates to an integral vitreous article composed of an opacified interior portion encased within a continuous, unbroken surface layer of a glass which is transparent, except for an opacified zone of predetermined configuration within the glass layer and extending to its surface. In a preferred embodiment, the article is formed from an alkaline aluminosilicate glass having a nepheline-type composition.

The method aspect of the invention resides in producing such article be delivering an opacifiable glass in the molten state to a forming surface, momentarily touching an area of the exposed surface on the molten glass with a heat absorbing member to selectively chill such surface area, removing the forming member, allowing the chilled surface to reheat sufficiently to become opacified, and thereafter forming the molten glass into a desired shape while extracting heat sufficiently rapidly to produce a transparent glass surface on the formed article, except for the opacified zone. Preferably, the heat absorbing member employed is a graphite or stainless steel stamp.

GENERAL DESCRIPTION

Figure 1:
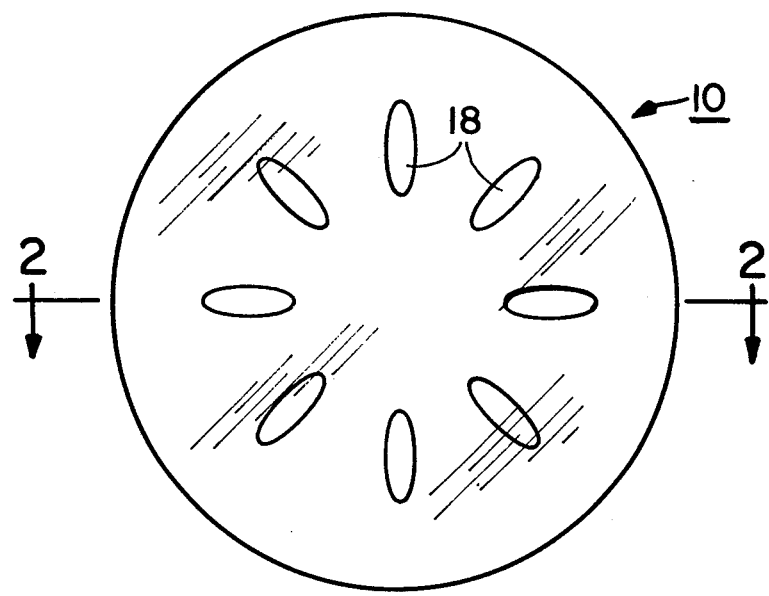
FIG. 1 is a top view of a pressed dinner plate having a pattern formed in its upper surface.

The companion Rittler applications describe integral vitreous articles composed of an opaque interior portion and a continuous, unbroken surface layer of transparent glass which completely covers and encases the opaque portion of the article. Such an article may be formed by delivering a selected molten glass to a forming surface, for example, a press mold or a sheet-forming roll, and forming the molten glass while rapidly extracting heat from the glass surface. The extraction of heat from the surface sharply increases glass viscosity in a surface layer, thereby inhibiting, in that layer, development of the physical phenomena which result in opacity due to light scattering.

Articles forming the subject matter of one companion application are produced from glasses having alkaline aluminosilicate compositions of a nepheline or feldspar nature. Opacification occurs in these glasses by formation and growth of titaniferous particles in the glass as it cools. However, the particle growth is inhibited, by rapid cooling or quenching, in a surface layer that remains transparent. In general, the glass compositions, calculated from the glass batch on an oxide basis in weight percent, consist essentially of 40–65% $SiO_2$, 10–30% $TiO_2$, 3–20% $Al_2O_3$, up to 5% of a titania color coupler and up to 20% of $R_2O+RO$.

The other companion application is concerned with opal glass articles formed from borosilicate type glasses which phase-separate when permitted to cool at a normal rate. Characteristically, these articles are composed of a transparent, single-phase, borosilicate glass layer formed over, and encasing, a phase-separated interior portion. The production of such an article is based on the discovery that phase separation in borosilicate glasses can be inhibited, at least within a surface layer, by rapidly extracting heat from that surface layer as an article is being formed. Borosilicate glasses useful in producing such articles have compositions which, expressed in weight percent on an oxide basis as calculated from the glass batch, consist essentially of 55–80% $SiO_2$, 5–18% $TiO_2$, 4–15% $B_2O_3$, and 3–20% of at least one mono- or divalent modifying oxide.

In either case, when heat is rapidly extracted from a surface layer as an article is being molded, the normal opal formation is inhibited in that surface layer. Thus, normal particle growth and/or phase separation cannot take place in the surface layer because glass viscosity is increased so abruptly by the rapid heat extraction.

The article of the present invention is a modified form of the integral composite article of either companion Rittler application. In this modified form, an opacified zone of predetermined design or configuration is formed in a transparent glass surface layer on an article. In the absence of a glass colorant, the opacified zone will have the characteristic white appearance of an opal glass. However, when a glass contains a titania-coupled colorant, the companion applications demonstrate that a wide variety of color effects may be achieved in the surface glass. In such a glass article, the opacified zone in the surface layer, characteristic of the present invention, is usually lighter in color than the general appearance of the article and similar to that of the interior glass portion.

It will be appreciated that the article of the present invention may take essentially any form into which glass can be molded. However, for purposes of illustration, the article is here shown and described with reference to a typical commercial article, namely, a pressed dinner plate.

Figure 2:
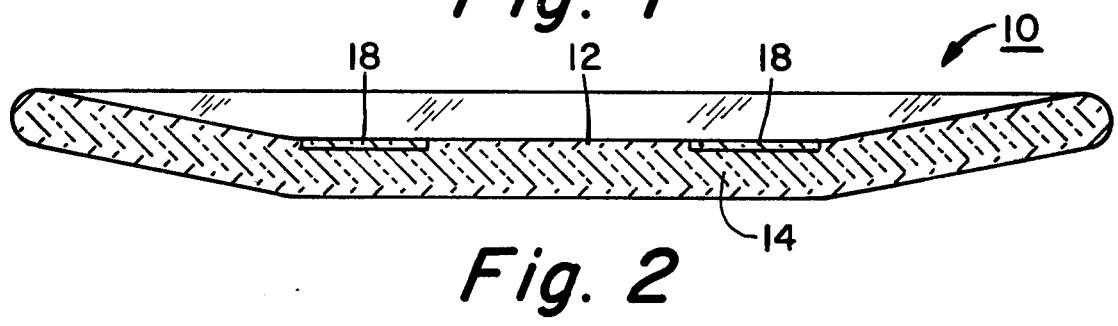
FIG. 2 is a view in enlarged cross section, taken along lines 2—2 of FIG. 1.

FIG. 1 is a top plan view of a dinner plate 10 having an opacified zone 18 formed as a decoration in its upper surface in accordance with the present invention. As shown in the cross-section view of FIG. 2, plate 10 consists of an interior or body portion 14, which is opacified, and a surface layer or skin 12 which is transparent, except for zone 18. Surface layer 12 is normally not over 0.010" (0.25 mm.) thick, and is usually about 0.005" (0.13 mm.) in thickness.

As illustratively shown here, opacified zone 18 may have a pattern or design, and may provide a decorative color contrast in the plate appearance. The provision of such a decoration or pattern, as hereafter described, provides several distinct advantages. It eliminates a further time consuming and expensive operation, such as applying a decal decoration and firing the decorated article to firmly adhere the decoration. Further, since the decoration is formed within the glass, its life equals that of the glass itself. Also, the familiar problem of lead, or other toxic metal, release is eliminated.

The opacified zone 18 is here described and illustrated in terms of a decorative effect on a piece of tableware. However, it should be appreciated that the benefits to be derived from the present invention are not so limited. In particular, it is well recognized that titanates can impart unusual electrical characteristics to glass. Therefore, it is contemplated that the development of titaniferous phases in selected surface areas or zones on a body of glass can produce unique capacitance, dielectric, and other electrical characteristics.

A particular feature of the present invention is a method of producing opacified zone 18 in transparent glass layer 12. We have found that the desired effect can be achieved by adapting the general principles of reheat opal practice to the present situation.

Opal glass literature, as exemplified by the Armistead and Stookey patents mentioned earlier, describes, in considerable detail, the nature of reheat opal glasses, and the manner in which opacity is developed in such glasses. Briefly, a reheat opal glass cools from the molten state as a clear transparent glass, but becomes opacified when it is reheated. It is believed that nuclei are formed during the initial cooling, but grow too slowly to produce opacification. However, when the glass is reheated, the nuclei grow more rapidly and the opal condition "strikes in", in the language of the art.

With respect to the present situation, we find that a zone on the glass surface can be quickly chilled to reduce its temperature below that value at which opacity can develop in the glass. Meanwhile, the bulk of the glass body, including that portion of the surface not chilled, remains molten. Then, the body of glass is molded in normal manner, as by pressing to form plate 10, while heat is rapidly extracted from over the entire article surface. In this way, a transparent surface layer 12 may be formed which encases an interior opacified portion 14 in the pressed article. However, zone 18, which was initially chilled while the remainder of the glass mass was molten, now is reheated sufficiently from the mass of molten glass surrounding it to cause an opal condition to "strike in". Further, the chilling effect on the article surface, during the pressing or other molding operation, does not alter this preformed opal zone 18.

Figure 3:
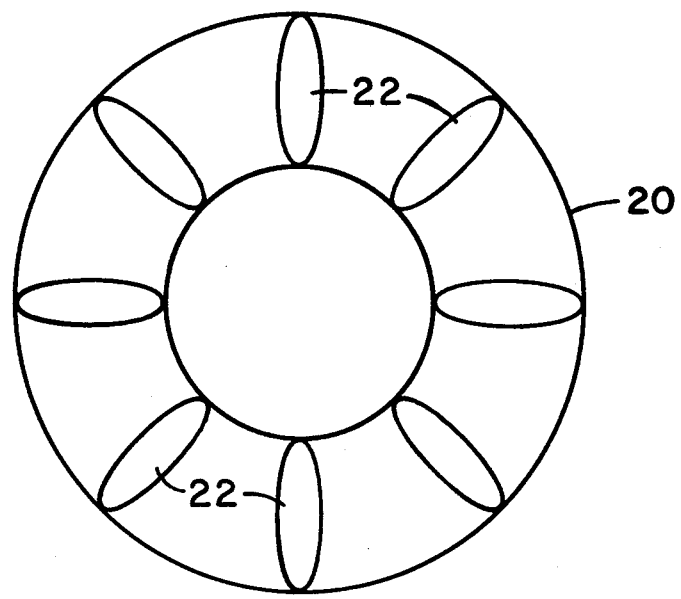
FIG. 3 shows the working face of a graphite stamp useful in producing the pattern of FIG. 1.

FIG. 3 shows a graphite stamp 20 having raised members 22 formed on its glass contacting surface by machining or etching. The configuration shown here for raised members 22 corresponds to a desired decoration. However, it will be appreciated that any desired pattern or configuration may be machined or etched in the face of stamp 20. Also, if a solid pattern is desired, as for electrical purposes, a solid or unmachined stamp might be employed.

Stamp 20 may be formed from any suitably inert material that is capable of resisting the molten glass temperatures involved in service. Thus, any material which does not stick to the molten glass, is not distorted or corroded at the temperatures of use involved, and that is resistant to corrosive influences such as rusting or staining, may be used for present purposes. Suitable materials include graphite, various metals such as stainless steel, and high temperature ceramic materials.

It will be appreciated that stamp 20 will be provided with suitable handling or supporting means (not shown), depending on the manner of use. For a hand operation, such as used with a single mold in experimental work, stamp 20 might be provided with uprights and a cross member adapted to be held by hand. In a mechanized unit, such as an indexing mold table, stamp 20 might be mounted in a manner similar to a pressing plunger, but at a station prior to the plunger.

SPECIFIC EXAMPLES

A glass, having a calculated composition by weight of 49% $SiO_2$, 10% $Al_2O_3$, 25% $TiO_2$, 10% $Na_2O$, 5% $ZrO_2$, and 1% $As_2O_3$, was melted at 1600° C. for 50 hours in a small tank having a capacity of several hundred pounds. The glass was delivered, both by ladling and by vacuum delivery, to a mold for pressing 10-inch diameter dinner plates.

Subsequent to depositing a charge of molten glass in the press mold, but before actual pressing, the glass charge was momentarily contacted, approximately in the center of its upper surface, with the machined face of graphite stamp 20. The glass charge was then pressed in the usual manner by a chilled pressing plunger. The resulting plate had a light tan earthenware appearance, except in the zone initially contacted with stamp 20. That zone, which was opacified rather than transparent, was essentially white.

A pressed plate was cut into strips, and optical photomicrographs were taken in cross-section. These showed the color to be in surface layer 12, which was about 0.005" (0.13 mm.) in thickness and which encased completely the white opal interior of the plate. Transmission electron microscopy data indicated particles having an average size of 550 Å in the skin glass while the interior opal portion contained crystals in the range of 1100-2000 Å. The volume crystallinity in the interior was about 60%, in contrast to the usual 5-10% in an ordinary opal glass.

A second glass, having a calculated composition of 61.6% $SiO_2$, 4.1% $Al_2O_3$, 2% $Na_2O$, 4.0% $ZrO_2$, 14.9% $TiO_2$, 2.0% CaO, 3.0% MgO, 1.5% $K_2O$, 5.0% $B_2O_3$ and 2.0% $Fe_2O_3$, was melted at 1600° C. for 55 hours in the same melting unit described above. In this case the glass was considerably more viscous at working temperature, and could be transferred to a glass pressing mold either by gathering from the tank or by ladling of the molten glass.

Prior to the actual pressing step, the charge of molten glass in the press mold was momentarily contacted with stamp 20 at the center of its upper surface in the manner described in the preceding example. Following this, the gob of molten glass was pressed in the mold to form a 10-inch dinner plate.

The plate had a blue-black appearance, characteristic of a glass with titania coupled to iron oxide as colorant. The pattern created by application of stamp 20 had a generally pale blue to white appearance against the darker color of the plate. However, the pattern was not as clear and distinct as that formed in the alkaline glass. Presumably, this is due to the different means of opal formation in the borosilicate type glass.

We claim:

1. An integral vitreous article composed of an opacified interior portion encased within a continuous, unbroken surface layer of a glass which is transparent, except for an opacified zone of predetermined configuration within and extending completely through said glass layer, said article having a uniform elemental, $TiO_2$-containing composition throughout selected from the group of:
   (a) an alkaline aluminosilicate composition of a nepheline or feldspar nature; and
   (b) a borosilicate composition; said opacification in said alkaline aluminosilicate composition being caused by the growth of titaniferous particles therein and said opacification in said borosilicate composition being caused by the development of phase separation therein.

2. An article in accordance with claim 1 wherein the surface layer is not over 0.010" thick.

3. An article in accordance with claim 1 wherein said alkaline aluminosilicate composition consists essentially, in weight percent on an oxide basis, of 40-65% $SiO_2$, 10-30% $TiO_2$, 3-20% $Al_2O_3$, up to 5% of a titania color coupler, and up to 20% $R_2O+RO$.

4. An article in accordance with claim 1 wherein said borosilicate composition consists essentially, in weight percent on an oxide basis, of 55-80% $SiO_2$, 5-18% $TiO_2$, 4-15% $B_2O_3$, and 3-20% of at least one mono- or divalent modifying oxide.

5. An article in accordance with claim 1 which is a pressed plate having an opal pattern formed in its upper surface.

* * * * *